US00RE44123E

(19) United States
(12) Reissued Patent
Otaka et al.

(10) Patent Number: US RE44,123 E
(45) Date of Reissued Patent: Apr. 2, 2013

(54) METHOD FOR INPUT CHARACTERS, APPARATUS THEREOF, AND MOBILE COMMUNICATION TERMINAL

(75) Inventors: Osamu Otaka, Tokyo (JP); Mineko Moroto, Tokyo (JP); Norioki Watanabe, Tokyo (JP); Shin-Ichirou Ide, Tokyo (JP); Naomi Nishikata, Tokyo (JP)

(73) Assignee: Nocom Audio NY LLC, Dover, DE (US)

(21) Appl. No.: 13/207,718

(22) Filed: Aug. 11, 2011 (Under 37 CFR 1.47)

Related U.S. Patent Documents

Reissue of:
(64) Patent No.: 7,574,238
Issued: Aug. 11, 2009
Appl. No.: 10/557,241
PCT Filed: May 18, 2004
PCT No.: PCT/JP2004/006640
§ 371 (c)(1),
(2), (4) Date: Nov. 16, 2005
PCT Pub. No.: WO2004/102374
PCT Pub. Date: Nov. 25, 2004

(51) Int. Cl.
*H04M 1/00* (2006.01)

(52) U.S. Cl. ..... 455/566; 455/418; 455/414.1

(58) Field of Classification Search ..... 455/414.1, 455/418–420, 550.1, 556.1, 556.2, 564–566; 345/156, 204, 168–169, 171, 179
See application file for complete search history.

(56) References Cited

U.S. PATENT DOCUMENTS 4,713,656 A * 12/1987 Cliff et al. ..... 345/168
4,954,818 A * 9/1990 Nakane et al. ..... 715/790
5,303,288 A 4/1994 Duffy et al.
5,592,609 A * 1/1997 Suzuki et al. ..... 345/473
5,718,631 A * 2/1998 Invencion ..... 463/19
5,793,381 A * 8/1998 Edberg et al. ..... 345/467
6,597,378 B1 7/2003 Shiraishi et al.
7,016,706 B2 3/2006 Kurokawa et al.
7,222,304 B2 5/2007 Beaton et al.
2002/0028705 A1* 3/2002 Kelly ..... 463/2
2002/0072394 A1 6/2002 Muramatsu
2002/0198046 A1* 12/2002 Nakazawa ..... 463/31

(Continued)

FOREIGN PATENT DOCUMENTS

CA 2053410 6/1992
CA 2053410 A1 6/1992

(Continued)

OTHER PUBLICATIONS

Communication from the European Patent Office for EP Application 10181986.0, dated Jan. 16, 2012.

(Continued)

*Primary Examiner* — Kamran Afshar
*Assistant Examiner* — Kashif Siddiqui

(57) ABSTRACT

The application (33) requests a basic processing part (31) to execute character input processing, depending on the character input request from the user during display of a graphics window managed by an application (33). The execution environment part (32), which received the character input processing request, notifies the basic processing part (31) of the character input processing request, and turns in a display blocked state. After that, characters are input under the control of the basic processing part (31). When character input is terminated, the basic processing part (31) closes the display of the character input screen to notify the execution environment part (32) of the termination of the character input and the character input result. The execution environment part (32), which received the notice, releases the display blocked state and notifies the application (33) of the termination of the character input and the character input result data.

20 Claims, 9 Drawing Sheets

U.S. PATENT DOCUMENTS

| | | | |
|---|---|---|---|
| 2003/0119562 | A1 | 6/2003 | Kokubo |
| 2005/0288001 | A1 | 12/2005 | Foster et al. |
| 2006/0229106 | A1 | 10/2006 | Otaka et al. |
| 2007/0120829 | A1 | 5/2007 | Ono |

FOREIGN PATENT DOCUMENTS

| | | | |
|---|---|---|---|
| DE | 691 27 800 | | 12/1990 |
| DE | 69127800 | T2 | 12/1990 |
| EP | 0 491 516 | | 6/1992 |
| EP | 0 491 516 | A2 | 6/1992 |
| EP | 0 491 516 | A3 | 6/1992 |
| EP | 0 491 516 | B1 | 6/1992 |
| JP | 2001-318751 | | 11/2001 |

OTHER PUBLICATIONS

Communication from the European Patent Office issued on EP Application 04733625.0, dated Oct. 10, 2006.

Communication from the European Patent Office on EP Application 04733625.0, mailed Jul. 31, 2007.

Extended Search Report for EP Application 10181986.0, dated Apr. 6, 2011.

International Preliminary Report on Patentability for PCT/JP2004/006640, issued Mar. 16, 2006.

International Search Report and Written Opinion for PCT/JP2004/006640, mailed Aug. 31, 2004.

Non-Final Office Action on U.S. Appl. No. 10/557,241, mailed Sep. 10, 2008.

Notice of Allowance issued on U.S. Appl. No. 10/557,241, mailed May 18, 2009.

Tang, JC et al: ConNexus to Awarenex: Extending awareness to mobile users Proceedings of ACM Special Interest Group on Computer and Human Interaction, XX, XX, vol. 3, No. 2, Mar. 31, 2001, pp. 221-228.

* cited by examiner

METHOD FOR INPUT CHARACTERS, APPARATUS THEREOF, AND MOBILE COMMUNICATION TERMINAL

Matter enclosed in heavy brackets [ ] appears in the original patent but forms no part of this reissue specification; matter printed in italics indicates the additions made by reissue.

RELATED APPLICATION

[This is a section 371 National Stage application of International application No. PCT/JP2004/06640 filed with Application date May 18, 2004.] *This application is a broadening reissue application of U.S. patent application Ser. No. 10/557,241, filed Nov. 16, 2005 (now U.S. Pat. No. 7,574,238, granted Aug. 11, 2009), which is a 371 National Stage application of International Application PCT/JP2004/06640, filed May 18, 2004, which claims Paris Convention priority from Japanese Application 2003-140691, filed May 19, 2003.*

BACKGROUND OF THE INVENTION

The present invention relates to a method for input characters, an apparatus thereof, and a mobile communication terminal. More particularly, the present invention relates to the method for input characters, depending on a character input request that is caused by different application used in a basic processing part, which manages processing of the character input, and the apparatus thereof, and the mobile terminal.

BACKGROUND ART

Conventionally, mobile communication terminals such as cellular phones and so forth are becoming popular. Functions and performances of these mobile communication terminals are remarkably improved, and now have a function of allowing the user to enjoy games by executing downloaded applications, not to mention its essential function, for example, the speech communication function and mail transceiving function. In the mobile communication terminal, basic processing such as speech communication processing, mail transceiving processing, and character input processing, is executed by the basic processing part in the mobile communication terminal. On the other hand, drawing processing on a display unit during execution of the game application is performed by using the first graphics program installed in the unit that is not under the control of the basic processing part.

As an example, when the application is a game application, and it is executing display on the display unit, a certain situation frequently occurs in which characters must be input to designate the name of the player or character in the game. In this case, the application acquires both of the character input processing and character input result as follows.

At first, when character input instruction is input from a user (to be also referred to as the "user" hereinafter), the application issues a character input request to the basic processing part, which manages character input processing.

The basic processing part received the character input request starts up the second graphics program (for example, graphics programs having GUI (Graphical User Interface) functions). Wherein the second graphics program may be used by the basic processing part, and it is used for executing exclusive control of display on the display unit with the first graphics program. As a result, drawing by the first graphics program is blocked, and a screen display derived from the second graphics program is displayed on the display unit.

Then, during displaying the screen derived from the second graphics program, when the user designates character input, for example, by moving the cursor onto the character input field, a character input screen derived from a character input program, which is managed by the basic processing part, is displayed. The user executes a character input operation in the character input screen. When the user finishes the character input operation and inputs a character input operation termination instruction, the basic processing part closes display of the character input screen, and then the display returns to the display screen by the second graphics program. In this stage, for example, the character string input in the character input field is displayed in the display screen by the second graphics program.

Subsequently, when the user inputs the second graphics program execution termination instruction, the basic processing part notifies the application of the store address of the input character string data and terminates the execution of the second graphics program. As a consequence, the display on the display unit returns to the display screen by the first graphics program. Then, the application reads out the character string data from the notified character string data store address and displays the characters in the display screen by the first graphics program as needed.

That is, when the character input request is issued while the drawing screen is displayed on the display unit by using the first graphics program under the control of the application, display control of the display unit sequentially changes from the first graphics program to the second graphics program managed by the basic processing part and then to the character input program managed by the basic processing part. Display on the display unit is changed every change of control. Then, character input is executed. When the display is to return to that by the application after inputting characters, the display control of the display unit also sequentially changes from the character input program to the second graphics program and then to the first graphics program. Display on the display unit is changed every change of control.

SUMMARY OF THE INVENTION

<Problems to be Solved by the Invention>

As described above, in the character input system employed in the conventional mobile communication terminal, when the user tries to input characters during screen display on the display unit by the application, he can solely input characters after the screen display on the display unit changes twice. After inputting characters, the displayed screen can solely return to that by the application after the screen display on the display unit changes twice. Accordingly, a kind of perception of the virtual world for contents such as a game, which is built or being built by the user who is looking at the display screen in executing the application, is diluted. This situation spoils the user's pleasure.

In the character input system employed in the conventional mobile communication terminal, when the user tries to input characters during screen display on the display unit by the application, he can solely input characters after executing the operation of switching the screen display twice. Alternatively, after inputting characters, twice operation of switching the screen display solely being capable of returning the display to the display screen by the application. Therefore, it is hard to say that character input is simple. Consequently, since the display screen switching operation is performed a number of times, an impression of complexity is given to the user. This also blunts the user's interest in the contents such as games.

Furthermore, the application can acquire the character input result only as the address in the memory unit where the input character string data is stored. Accordingly, the application notified of the termination of the character input must read out the character string data by itself.

The present invention has been made in consideration of the above situation. The object of the present invention is to provide the method for inputting characters and the apparatus thereof which capable of performing character input conveniently during screen display on the display unit by the application installed in the mobile communication terminal.

Another object of the present invention is to provide the mobile communication terminal capable of performing character input conveniently during screen display on the display unit by the application.

<Means For Solving The Problems>

According to the first aspect of the present invention, the present invention is character input method comprising steps of: requesting a character input processing to basic processing part, when a character input request is inputted from a user during display of a graphics screen managed by an application different from the basic processing part, the basic processing part managing the character input processing in a mobile communication terminal; prohibiting the application display for prohibiting display by the application; displaying a character input screen, wherein the user executes a character input operation, displayed by the basic processing part immediately after the completion of the application display prohibition step; and resuming application display by the application, wherein the display is immediately resumed by closing the display of the character input screen, after the user finishes the character input operation, referring the screen for the character input In this method, the transceiving unit requests the basic processing part to execute character input processing in the character input processing request step, when the user inputs the character input request during display of the graphics window managed by the application. Display by the application is prohibited in the application display prohibition step, depending on the character input processing request.

Thus, when display by the application is prohibited, the basic processing part having received the character input processing request immediately displays the character input screen for users to execute a character input operation. After that, the user inputs characters, referring to the character input screen. Then, the user instruct to terminate the character input operation performed by the user, looking at the character input screen, the display of the character input screen is immediately closed and the display by the application is resumed, as well as the application is notified of the character input result in the application display resumption step.

That is, according to the character input method of the present invention, the minimum number change of the screen display in the display unit, once, enables to character input, when the character input is performed during display of the graphics screen on the display unit by the application. Furthermore, after inputting characters, the display may return to the display screen by the application, depending on the minimum number change of the window screen on the display unit only once. Therefore, according to the character input method of the present invention, character input conveniently may be performed during display of the graphics screen on the display unit by the application, which is installed in the mobile communication terminal. Furthermore, the interest in the contents of games and so forth executed may be prevented from declining, even in characters are input.

In the method for inputting characters of the present invention, the application can be notified of input character string data in the application display resumption step. Wherein, a term "character string" comprises not only a plurality of characters but also one character. In this specification, the term "character string" is used in this meaning.

In this case, the input character string data is directly notified of the application. Therefore, the operation for reading out the input data, a character input result, from the memory unit by the application is not necessary as that employed in the prior art.

The mobile communication terminal of the present invention is a character input apparatus comprising a basic processing part for managing character input processing and an execution environment part for providing an execution environment to execute a different application employed in the basic processing part: the basic processing part comprising character input management means for terminating the display of a character input screen, wherein the character input screen for users to input characters is displayed immediately after receiving a character input processing request from the application, as well as the character input screen is closed immediately after the user finish to input characters referring the character input screen; and the execution environment part comprising application display control means for resuming display by the application, wherein the execution environment part prohibits the display by the application after receiving a character input request during displaying a screen derived from graphics managed by the application, as well as resumes the display by the application after inputting characters is finished.

In this character input apparatus, the application issues the character input processing request depending on the character input request by the user during display of the graphics screen managed by the application. Then, the application display management means in the execution environment part prohibits displaying by the application and transmits the character input processing request to the basic processing part. The character input management means of the basic processing part received the character input processing request immediately displays the character input screen on which the user executes the character input operation. After that, the user inputs characters, referring to the character input screen. When the user instructs the termination of the character input operation, looking at the character input screen, the character input management means notifies the termination of the character input processing and the result of the character input of the execution environment part, and terminates to display the character input screen. Then, the execution environment part immediately resumes the display by the application and transmits the character input result to the application.

That is, the character input apparatus of the present invention may execute to input characters by using the above-mentioned method for inputting characters of the present invention. Therefore, according to the character input apparatus of the present invention, the characters may be conveniently input during displaying the graphics screen on the display unit by the application, which is installed in the mobile communication terminal. Furthermore, the interest in the contents of games and so forth executed may be prevented from declining, even in characters would be input.

In the character input apparatus of the present invention, the following composition may be employed: the basic processing part may notify the execution environment part of input character string data, and the execution environment part may notify the application of the input character string data. In this case, the operation for reading out the input data, a character input result, from the memory unit by the application is not necessary as that employed in the prior art.

The mobile communication terminal of the present invention comprises wireless communication means for executing wireless communication with a base station; and a character input apparatus of the present invention.

In the mobile communication terminal, the character input processing is executed by the above-mentioned character input apparatus of the present invention. Therefore, the characters may be conveniently input during display of the graphics screen on the display unit by the application, as well as the interest in the contents of games and so forth executed may be prevented from declining, even in characters would be input.

<Effects Of The Invention>

As described above, the method for inputting characters of the present invention gives advantageous effect that the characters may conveniently input during screen display on the display unit by the application, which is installed in the mobile communication terminal.

Furthermore, the character input apparatus of the present invention gives other advantageous effect that the characters may conveniently input during screen display on the display unit by the application, which is installed in the mobile communication terminal, because the method for inputting characters of the present invention is employed.

The mobile communication terminal of the present invention gives other advantageous effect that he characters may conveniently input during screen display on the display unit by the application, which is installed in the mobile communication terminal, because the mobile communication terminal comprises the character input apparatus of the present invention.

DETAILED DESCRIPTION

An embodiment of the present invention is described below with reference to FIGS. 1A to 7.

Figure 1A:
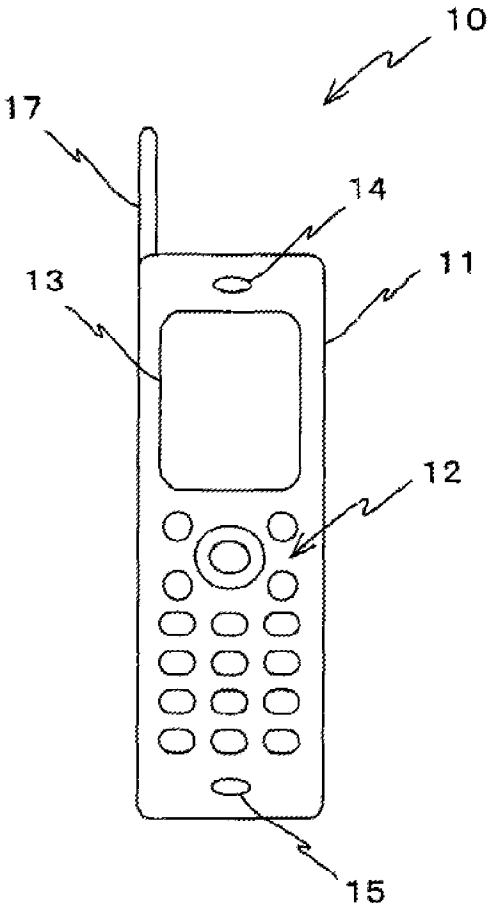
FIG. 1A is a front view of the outer appearance of a cellular phone according to an embodiment of the present invention.
Figure 1B:
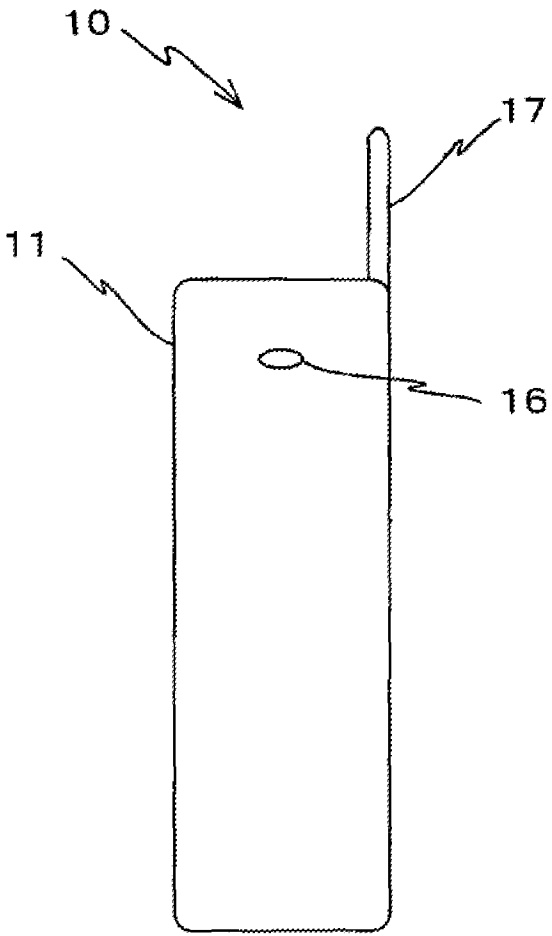
FIG. 1B is a rear view of the outer appearance of the cellular phone according to the embodiment of the present invention.
Figure 2:
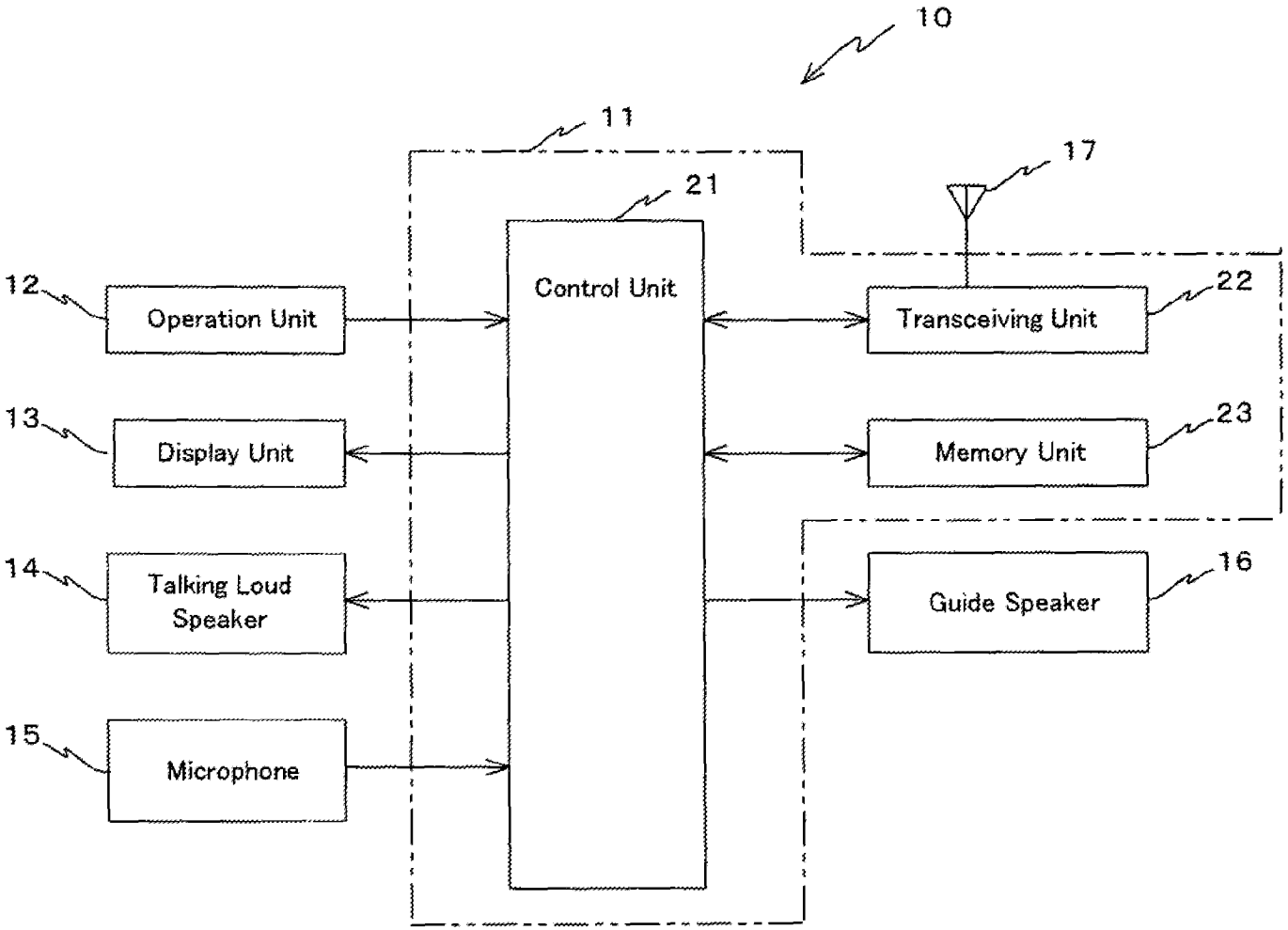
FIG. 2 is a functional block diagram of the cellular phone shown in FIG. 1.

Referring FIGS. 1 and 2, it is schematically illustrated that the structure of the cellular phone 10 as a mobile communication terminal according to the embodiment. Referring FIGS. 1A and 1B, it is illustrated that the front view of the external appearance of the cellular phone 10, and the rear view of the external appearance of the cellular phone 10. Referring FIG. 2, it is illustrated that the functional block configuration of the cellular phone 10.

As comprehensively shown in FIGS. 1A, 1B, and 2, the cellular phone 10 comprises (a) the cellular phone body 11 having the control unit 21, the transceiving unit 22, and the memory unit 23, (b) the operation unit 12 having a ten-key pad to input a telephone number to the control unit 21 and function keys to input a variety of instructions for example, that of operation mode switching to the control unit 21 and so forth, and (c) the display unit 13 having a liquid crystal display to display an operation guide, operation status, and received message in accordance with an instruction from the control unit 21. The cellular phone 10 also comprises (d) the conversation loudspeaker 14 for playing back a speech signal transmitted from a communication partner during conversation, the microphone 15 for inputting speech during conversation, (e) the guidance speaker 16 to generate a ring tone or guidance tone in accordance with the instruction from the control unit 21, and (f) the antenna 17 being connected to the transceiving unit 22 and to transceive radio signals with a base station.

Figure 3:
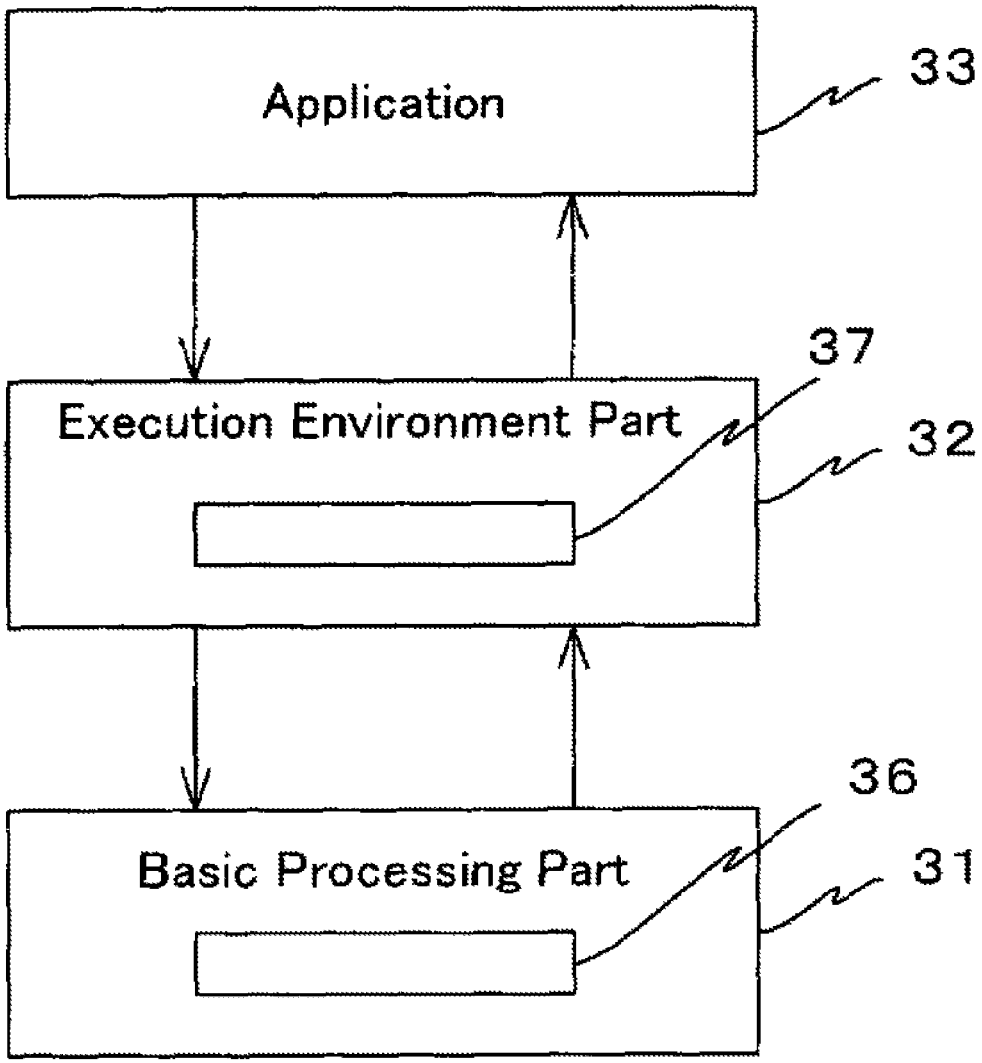
FIG. 3 is a block diagram schematically showing the configuration of software operated by a control unit shown in FIG. 2.

The control unit 21 comprises a central processing unit (CPU) and digital signal processor (DSP), and performs various types of data processing and controls the operations of the other components described above, in order to realize general cellular phone functions. FIG. 3 shows the configuration of software such as a program executed in the control unit 21.

More specifically, the software in the control unit 21 comprises (i) the basic processing part 31 implementing the basic function for the cellular phone, the speech communication function, the mail function, and the character input function, and controls the above-mentioned variety of hardware resources, (ii) the application 33 providing various contents such as games and the like to the user, and (iii) the execution environment part 32 positioning between the basic processing part 31 and the application 33 to provide the execution environment of the application 33. The execution environment part 32 is a set of programs to provide software resources for executing applications such as command conversion between the application 33 and the basic processing part 31 and management of the application 33. The basic processing part 31 comprises the character input program 36 as a character input management means. The execution environment part 32 comprises the graphics program 37 as an application display management means for graphics display to be utilized by the application 33.

The basic processing part 31 and the execution environment part 32 are implemented in the cellular phone already at shipment from the factory. The application 33 is downloaded from the transceiving unit 22 and to be implemented by operating the operation unit 12 by the user. The application employed in the cellular phone 10 is not limited to one, and normally located in the cellular phone 10. However, referring to FIG. 3, the sole application 33 is schematically illustrated.

Between the basic processing part 31 and execution environment part 32, information such as requests, responses, or events generation relating to the application 33 is appropriately exchanged. In addition, between the execution environment part 32 and the application 33, the application notices the execution environment part 32 of a variety of requests, and the execution environment part 32 notices the response or the event generation of the application 33.

Then, character input processing during display of a graphics screen on the display unit 13 by the application 3 is explained in below, wherein the character input processing is executed by the cellular phone 10 having the above-described arrangement 3.

Figure 4:
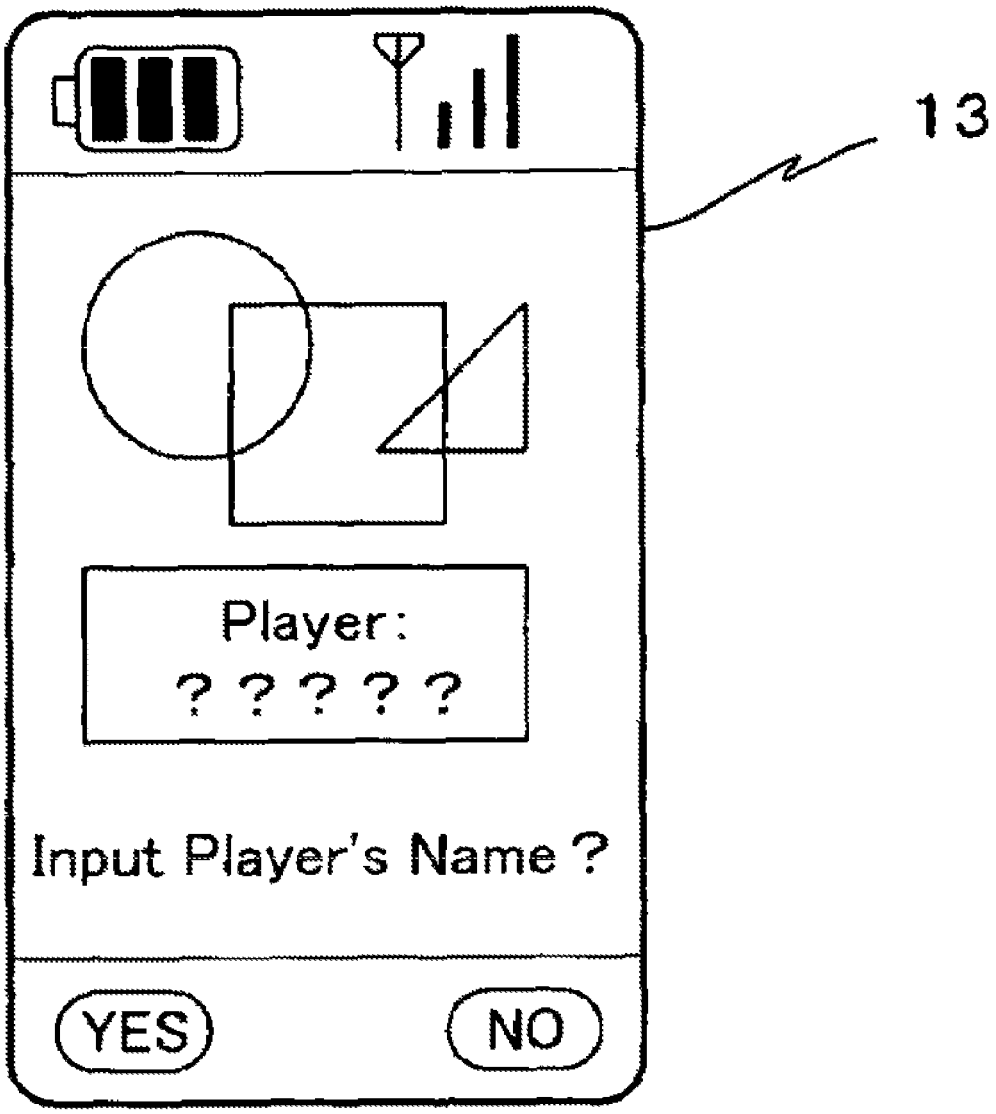
FIG. 4 is a view showing a screen display example by an application before character input processing is performed.

Assume that the application 33 is a game application, and the application 33 is displaying graphics shown in FIG. 4 on the display unit 13 by using the graphics program 37 in the execution environment part 32 to urge the user to chose whether to input the name of the game player or not.

Figure 5:
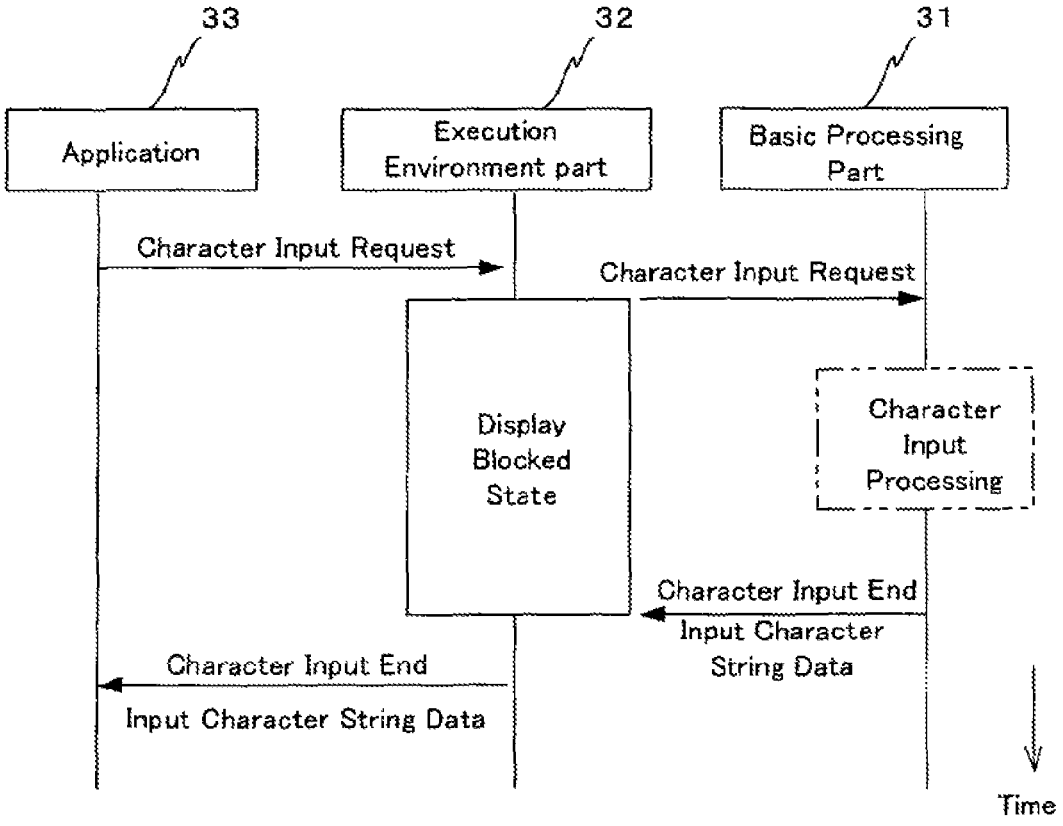
FIG. 5 is a sequence chart for explaining the character input processing.

In this state, the user inputs "YES", which represent that he chooses to input the name of the game player, the character input processing according to the sequence shown in FIG. 5 starts. FIG. 5 is the sequence chart showing a time series with the time plotted along the ordinate.

In this character input processing, firstly, the application 33 notifies the execution environment part 32 of the character input request. The execution environment part 32 notifies the basic processing part 31 of the character input request depending on the character input request received, as well as becoming a display blocked state to ignore a drawing request from the application 33. Note that the response representing that a drawing request is received by the execution environment part 32 returns to the application 33, when the drawing request is received. However, the drawing processing in response to the drawing request is not performed by the graphics program 37. Therefore, it looks that there is no difference between the operation performed by the execution environment part 32 or that performed by the basic processing part 31 in this case and that performed in normal drawing processing in the view point of the application 33. However, the display responding to the application 33 to the display part 13 is actually not performed.

Figure 6A:
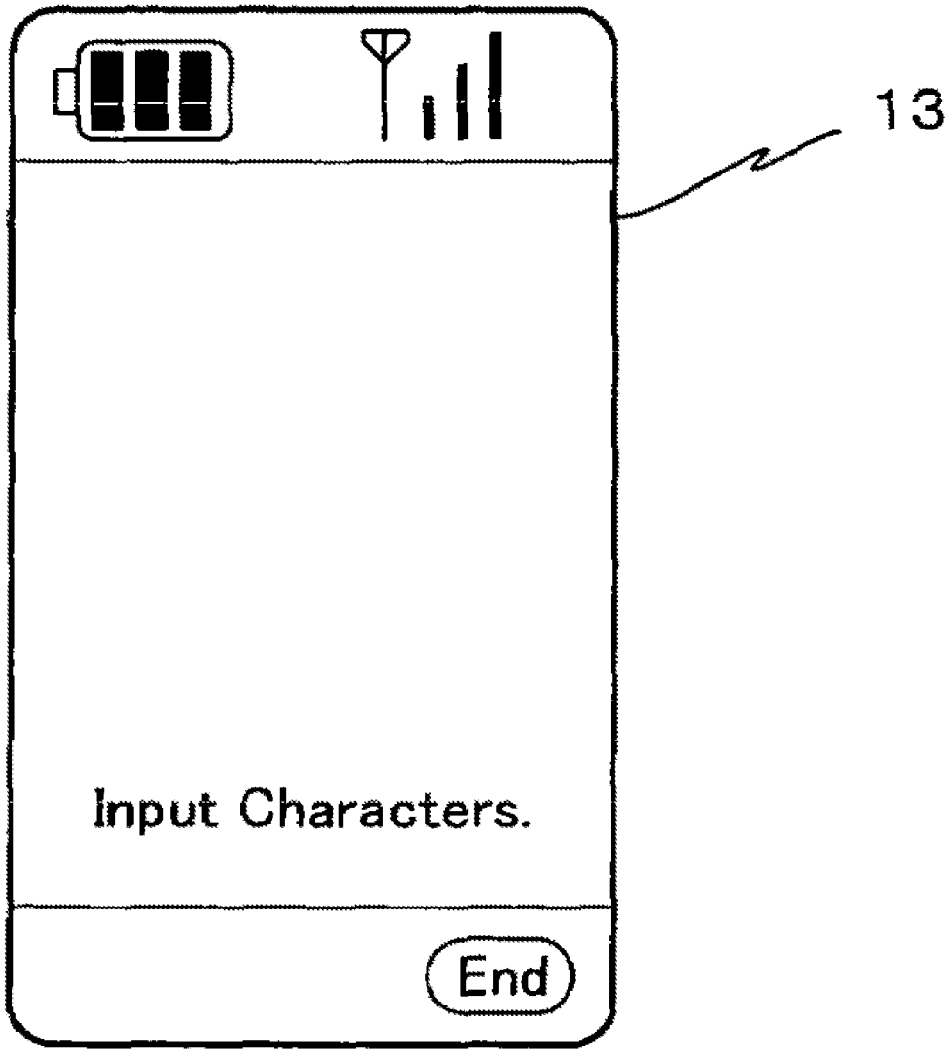
FIG. 6A is a view showing an example of a display of a character input screen before characters are input.

The basic processing part 31 that receives the character input request from the execution environment part 32 starts the character input program 36. As a result, a character input screen shown in FIG. 6A is displayed on the display unit 13 by the character input program 36.

Then, the user inputs the name of the player by operating the operation unit 12, looking at the character input screen. When the character string "Seishonagon" is input as the name, the character input result is displayed on the display unit 13, as shown in FIG. 6B.

Figure 6B:
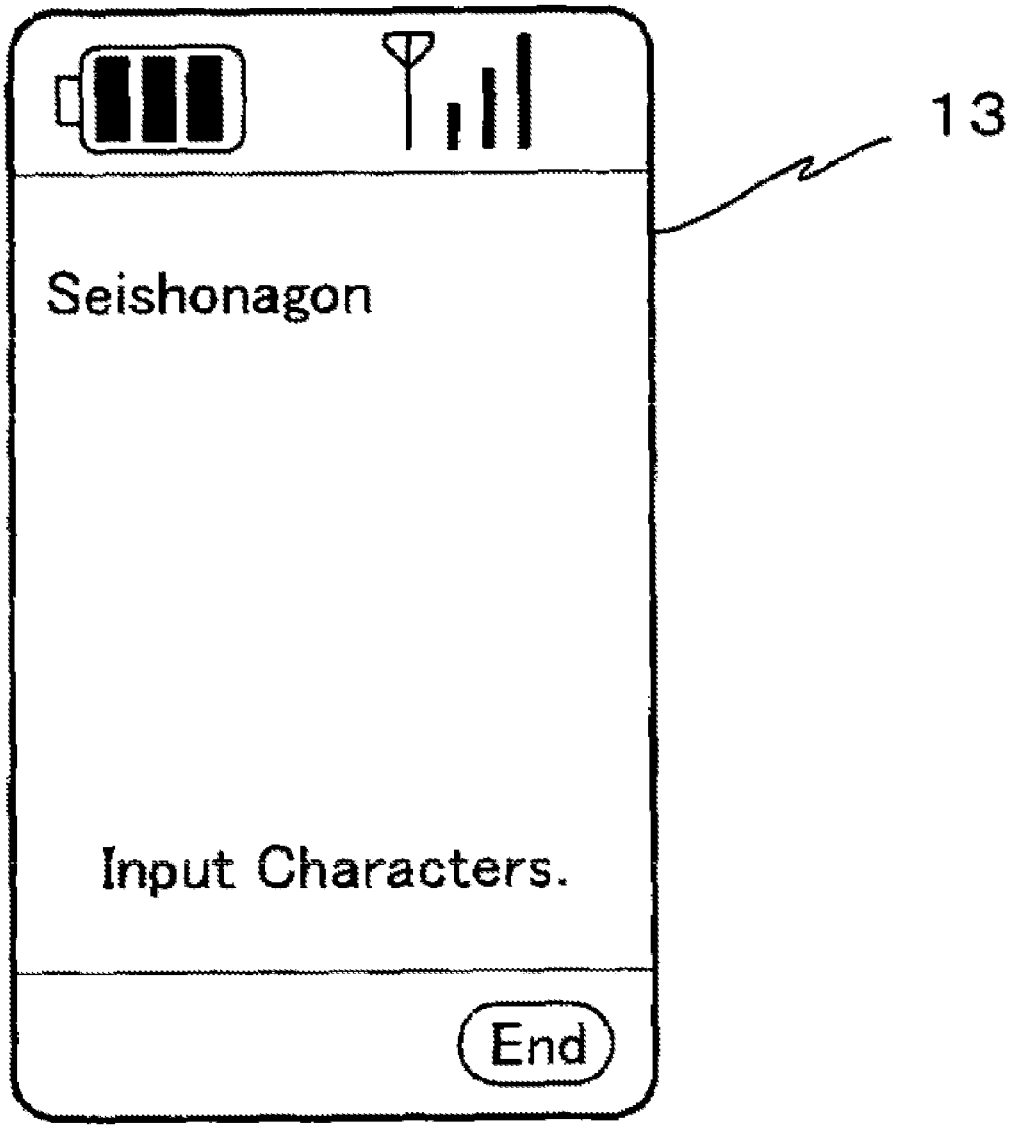
FIG. 6B is a view showing another example of the display of the character input screen after characters are input.

After the characters and "termination" are sequentially input by the user, referring back to FIG. 5, the basic processing part 31 notifies the execution environment part 32 of the termination of the character input and the input character string data (the character string data "Seishonagon" as the example shown in FIG. 6B). The execution environment part 32 that receives the notification of the termination of the character input and the input character string data releases the display blocked state, and then notifies the application 33 of the termination of the character input and the input character string data.

Figure 7:
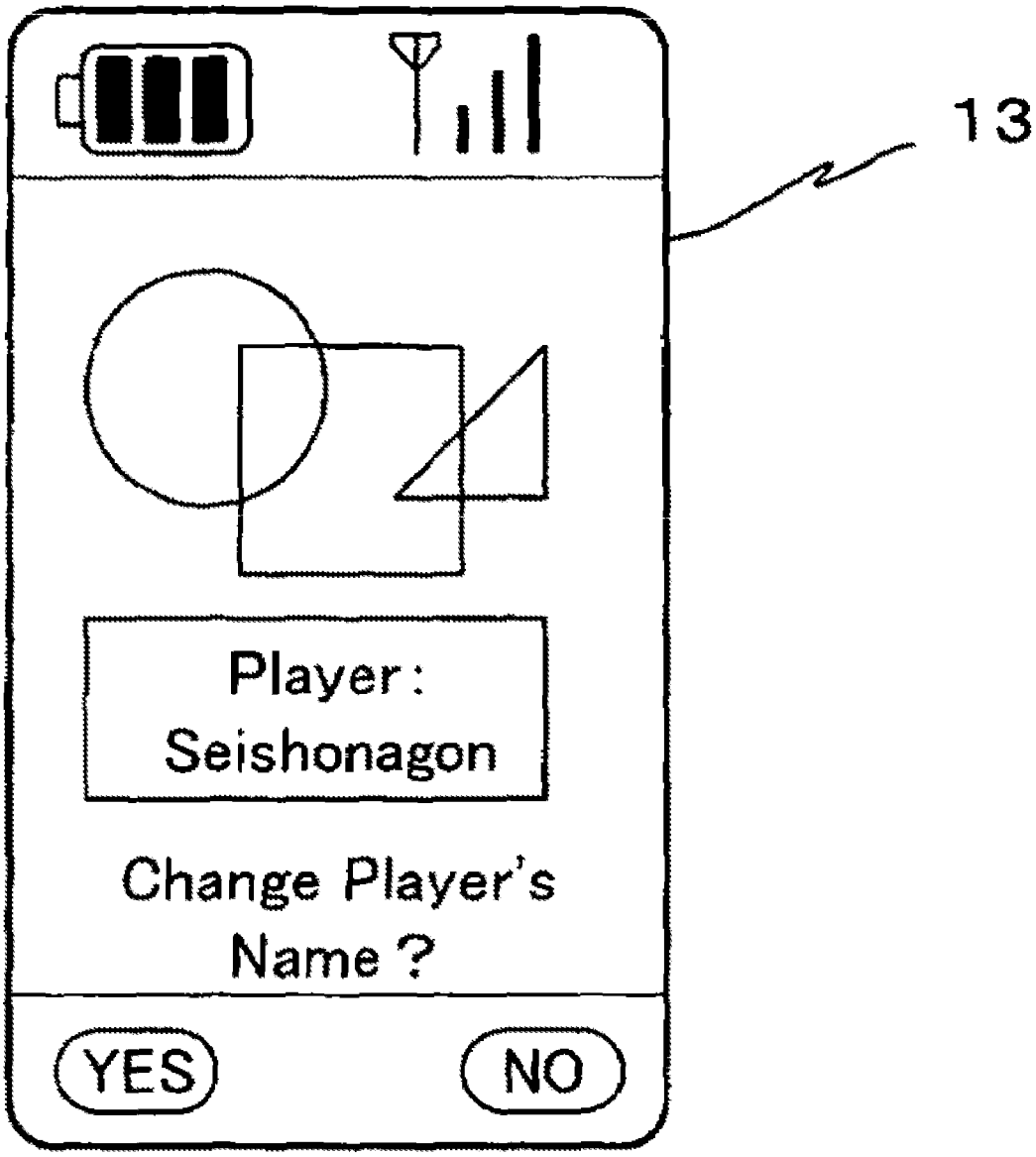
FIG. 7 is a view showing the example of a screen display by the application after character input processing.

Then, the application 33, which received the notification of the termination of the character input and the input character string data, displays the input character string data on the display unit 13 together with other display elements. FIG. 7 shows one example of the display. Thus, the character input processing during display of the graphics screen on the display unit 13 by the application 33 is finished.

As described above, in this embodiment, the application 33 sends the basic processing part 31 to execute character input processing, depending on the character input request by the user during display of the graphics screen managed by the application 33. Subsequently, the execution environment part 32, which received the character input processing request, notifies the basic processing part 31 of the character input processing request to set in the display blocked state. Then, the basic processing part 31, which received the character input processing request, displays the character input screen. After that, the user inputs characters, looking at the character input screen. The basic processing part 31 terminates the display of the character input screen depending on the instruction for finishing the character input by the user. Then, it notifies the execution environment part 32 of the termination of the character input and the character input result. The execution environment part 32, which received the notification of termination of the character input and the character input result, releases the display blocked state, and notifies the application 33 of the termination of the character input and the character input result data.

Accordingly, in the embodiment, the characters may be conveniently input during display of the graphics screen on the display unit 13 by the application, which is installed in the cellular phone 10. Thereby, the characters may be conveniently input during display of the graphics screen on the display unit by the application, as well as the interest in the contents of games and so forth executed may be prevented from declining, even in characters would be input.

Alternatively, the basic processing part directly notifies the input character string data itself of the application through the execution environmental part 32. Therefore, the operation for reading out the input result data is not necessary for the application The present invention is not limited to the above-described embodiment, and various changes and modifications can be made.

For example, in the above embodiment, the character input processing to input the name of the game player has been described. However, the character input processing could be similarly executed when the character input processing in other situations, such as inputting the names of the characters appeared and the like, are performed. 2

Alternatively, in the above embodiment, there is mentioned the game application as the example of the application 33. However, the present invention also can be applied to any other kind of application, similarly to the above embodiment.

Furthermore, when the character code (fro example, shift-JIS code) used for the character input program 36 in the basic processing part 31 is different from that (for example, Unicode) used for the application 33, the code may be converted by either of the basic processing part 31 or application 33.

In the above embodiment, the present invention is applied to the cellular phone. However, the present invention also can be applied to any mobile communication terminal other than the cellular phone.

As has been described above, the method for inputting characters and the character input apparatus of the present invention may be applied to character input performed by the user during display of the graphics screen managed by an application, which is different from the basic processing part managing character input processing in the mobile communication terminal. Alternatively, the mobile communication terminal of the present invention may be applied to the mobile communication terminal such as the cellular phone, which executes applications.

What is claimed is:

[1. A character input method comprising steps of:

requesting a character input processing to a basic processing part, when a character input request is inputted from a user during display of a graphics screen managed by an application different from the basic processing part, the basic processing part managing character input processing in a mobile communication terminal;

prohibiting the application display for prohibiting display by the application;

displaying a character input screen, wherein the user executes a character input operation, displayed by the basic processing part immediately after the completion of the application display prohibition step; and resuming application display by the application, wherein the display is immediately resumed by closing the display of the character input screen, after the user finishes the character input operation, referring the screen for the character input.]

[2. A method according to claim 1, wherein the application is notified of input character string data in the application display resumption step.]

[3. A mobile communication terminal comprising a basic processing part for managing character input processing and an execution environment part for providing an execution environment to execute a different application employed in the basic processing part:

the basic processing part comprising:

character input management means for terminating the display of a character input screen, wherein the character input screen for users to input characters is displayed immediately after receiving a character input processing request from the application, as well as the character input screen is closed immediately after the user finish to input characters referring the character input screen; and the execution environment part comprising:

application display control means for resuming display by the application, wherein the execution environment part prohibits the display by the application after receiving a character input request during displaying a screen derived from graphics managed by the application, as well as resumes the display by the application after inputting characters is finished.]

[4. An character input apparatus according to claim 3, wherein the basic processing part notifies the execution environment part of input character string data, and the execution environment part notifies the application of the input character string data.]

[5. A mobile communication terminal comprising:

wireless communication means for executing wireless communication with a base station; and a character input apparatus according to claim 3.]

[6. A mobile communication terminal comprising:

wireless communication means for executing wireless communication with a base station; and a character input apparatus according to claim 4.]

*7. A method comprising:*

*receiving a request for character input processing at a basic processing part of a mobile communication terminal, wherein the request is received from an application;*

*prohibiting the application from using a display of the mobile communication terminal;*

*displaying a character input screen on the display, wherein the character input screen is displayed immediately after prohibiting the application from using the display of the mobile communication terminal;*

*receiving a character input;*

*displaying the character input on the display;*

*closing the character input screen; and*

*allowing the application to use the display.*

*8. The method of claim 7, further comprising sending the application the character input.*

*9. The method of claim 7, wherein the application is a graphics program.*

*10. The method of claim 7, wherein a drawing request by the application is accepted while the application is prohibited from using the display.*

*11. The method of claim 7, wherein the character input screen is closed when a terminating input character is received.*

*12. The method of claim 7, further comprising changing the character input from a first character code to a second character code.*

*13. The method of claim 12, wherein the first character code is shift-JIS and the second character code is Unicode.*

*14. A device comprising:*

*a display;*

*an input interface; and*

*a control unit operatively coupled to the display and the input interface and configured to:*

*receive a request for character input processing at a basic processing part of a mobile communication terminal, wherein the request is received from an application,*

*prohibit the application from using the display,*

*display a character input screen on the display, wherein the character input screen is displayed immediately after the application is prohibited from using the display,*

*receive a character input from the user input interface,*

*display the character input on the display,*

*close the character input screen, and*

*allow the application to use the display.*

*15. The device of claim 14, further comprising sending the application the character input.*

*16. The device of claim 14, wherein the application is a graphics program.*

*17. The device of claim 14, wherein a drawing request by the application is accepted while the application is prohibited from using the display.*

*18. The device of claim 14, wherein the character input screen is closed when a terminating character is received from the user input interface.*

*19. The device of claim 14, further comprising changing the character input from a first character code to a second character code.*

*20. The device of claim 19, wherein the first character code is shift-JIS and the second character code is Unicode.*

*21. A non-transitory computer readable medium containing instructions comprising:*

*instructions for receiving a request for character input processing at a basic processing part of a mobile communication terminal, wherein the request is received from an application;*

*instructions for prohibiting the application from using a display of the mobile communication terminal;*

*instructions for displaying a character input screen on the display immediately after prohibiting the application from using the display of the mobile communication terminal;*

*instructions for receiving a character input from a user;*

*instructions for displaying the character input on the display;*

*instructions for closing the character input screen; and*

*instructions for allowing the application to use the display.*

*22. The non-transitory computer readable medium of claim 21, further comprising instructions for sending the application the character input.*

*23. The non-transitory computer readable medium of claim 21, wherein the application is a graphics program.*

*24. The non-transitory computer readable medium of claim 21, wherein a drawing request by the application is accepted while the application is prohibited from using the display.*

*25. The non-transitory computer readable medium of claim 21, wherein the character input screen is closed when a terminating character is received from the user.*

*26. The non-transitory computer readable medium of claim 21, further comprising instructions for changing the character input from a first character code to a second character code.*

* * * * *

UNITED STATES PATENT AND TRADEMARK OFFICE

CERTIFICATE OF CORRECTION

PATENT NO. : RE44,123 E
APPLICATION NO. : 13/207718
DATED : April 2, 2013
INVENTOR(S) : Otaka et al.

It is certified that error appears in the above-identified patent and that said Letters Patent is hereby corrected as shown below:

On the Title Page, below Item (64), insert Item -- (30) Foreign Application Priority Data
May 19, 2003 (JP) ..... 2003-140691 --.

Title Page 2, in Item (56), under "FOREIGN PATENT DOCUMENTS", in Column 1, Line 5, delete "6/1992" and insert -- 3/1993 --, therefor.

Title Page 2, in Item (56), under "FOREIGN PATENT DOCUMENTS", in Column 1, Line 6, delete "6/1992" and insert -- 10/1997 --, therefor.

Title Page 2, in Item (56), under "OTHER PUBLICATIONS", in Column 2, Line 13, delete "JC et al:" and insert -- J. C. et al.: --, therefor.

Title Page 2, in Item (56), under "OTHER PUBLICATIONS", in Column 2, Line 14, delete "users" and insert -- users, --, therefor.

In the Specifications:

In Column 3, Line 36, delete "input" and insert -- input. --, therefor.

In Column 6, Line 67, delete "application 3" and insert -- application 33 --, therefor.

In Column 7, Line 3, delete "arrangement 3." and insert -- arrangement. --, therefor.

In Column 7, Line 30, delete "display part" and insert -- display unit --, therefor.

In Column 8, Line 26, delete "application" and insert -- application. --, therefor.

In Column 8, Line 35, delete "performed. 2" and insert -- performed. --, therefor.

In Column 8, Line 40, delete "(fro" and insert -- (for --, therefor.

Signed and Sealed this
Third Day of September, 2013

Teresa Stanek Rea

Teresa Stanek Rea
*Acting Director of the United States Patent and Trademark Office*